United States Patent
Takahashi et al.

(10) Patent No.: US 6,951,473 B2
(45) Date of Patent: Oct. 4, 2005

(54) IC CARD READER

(75) Inventors: Kazunori Takahashi, Nagano (JP); Toshio Tatai, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/844,754

(22) Filed: May 12, 2004

(65) Prior Publication Data

US 2005/0007728 A1 Jan. 13, 2005

(30) Foreign Application Priority Data

May 13, 2003  (JP) ........................................ 2003-135034

(51) Int. Cl.$^7$ .............................................. H01R 13/62
(52) U.S. Cl. ...................................... 439/327; 235/475
(58) Field of Search ................................ 439/327, 630; 235/475, 479, 493, 441, 449, 483, 486

(56) References Cited

U.S. PATENT DOCUMENTS

| | | | | |
|---|---|---|---|---|
| 5,012,078 A | * | 4/1991 | Pernet ......................... | 235/441 |
| 6,367,700 B1 | * | 4/2002 | Kanayama et al. .......... | 235/475 |
| 6,478,592 B1 | * | 11/2002 | Hu et al. ..................... | 439/159 |
| 6,878,000 B2 | * | 4/2005 | Akasaka et al. ............ | 439/153 |

FOREIGN PATENT DOCUMENTS

| | | | | |
|---|---|---|---|---|
| EP | 1035495 A2 | * | 9/2000 | .......... G06K/13/08 |
| JP | 61-156384 | | 7/1986 | |
| JP | 64-88890 | * | 3/1989 | .......... G06K/17/00 |
| JP | 03-166680 | | 1/1991 | |

* cited by examiner

Primary Examiner—P. Austin Bradley
Assistant Examiner—Phuongchi Nguyen
(74) Attorney, Agent, or Firm—Reed Smith LLP

(57) ABSTRACT

An IC card reader comprising a contact head holding body which is given a force in the card discharge direction and makes contact with an IC card at the insertion of the card. The card reader also comprises a card latch lever that is operated between an open mode, in which an IC card can be inserted and removed, and a closed mode, in which an IC card cannot be inserted or removed; an operating arm for moving the card latch lever and for holding the card latch lever in the closed mode; and an operating lever for moving the operating arm. The card latch lever enters the closed mode with the movements of the operating lever and the operating arm after an IC card is inserted to a predetermined position. The contact head holding body and the operating lever are connected with each other so that the operating lever moves synchronously with the movement of the contact head holding body.

2 Claims, 10 Drawing Sheets

IC CARD READER

CROSS-REFERENCE TO RELATED APPLICATION

This application claims priority of Japanese Application No. 2003-135034, filed May 13, 2003, the complete disclosure of which is hereby incorporated by reference.

BACKGROUND OF THE INVENTION a) Field of the Invention

The present invention relates to an IC card reader that reads and writes data with respect to IC cards. More specifically, the present invention relates to a latch mechanism for closing a card discharge opening after an IC card is inserted so that the IC card cannot be removed.

b) Description of the Related Art

An IC card reader is equipped with a card latch lever that is operated between an open mode and a closed mode: in the open mode, IC cards can be inserted and removed; in the closed mode, IC cards cannot be inserted or removed. An IC card reader of this type is also equipped with a mechanism that moves the card latch lever to the open mode at the insertion of an IC card and to the closed mode at the removal of an IC card.

For example, as illustrated in FIG. 9, known is an IC card reader 105 that has a contact head holding body 100, a slider 101, a lever 102, and a swing lever 104. The contact head holding body 100 is pushed deep inside at the insertion of an IC card. The slider 101, provided separately from the contact head holding body 100, is pushed deep inside when the contact head holding body 100 is moved deep inside by a predetermined distance to make contact therewith. The lever 102 is pushed deep inside when the slider 101 is moved deep inside by a predetermined distance to make contact therewith. The swing lever 104 is rotated by the lever 102 to open/close a card latch lever 103 (Japanese laid-open patent application S61-156384).

As illustrated in FIG. 10, also known is an IC card reader 105 that has a lever 106, a swing lever 107, and a link 108. The lever 106 is pushed deep inside at the insertion of an IC card. The swing lever 107 rotates with the movement of the lever 106. The link 108 is pushed toward the front with the rotation of the swing lever 107 to open/close the card latch lever 103 (Japanese laid-open patent application H3-166680).

The following additional patent references are known: Japanese laid-open patent application S61-156384 (Patent Reference 1) and Japanese laid-open patent application H3-166680 (Patent Reference 2).

Problems to be Solved

However, in the IC card reader 105 disclosed in Patent Reference 1 in which the card latch lever 103 is moved to the closed mode via the movement of the contact head holding body 100, the contact head holding body 100 is provided separately from the slider 101. Therefore, the inserted IC card comes into contact with the contact head holding body 100 first, and then the contact head holding body 100 comes into contact with the slider 101 as the IC card is further inserted to move by a predetermined distance. Although the initial insertion load of the IC card is only the load of the contact head holding body, the load of the slider 101 is added as soon as the contact head holding body 100 makes contact with the slider 101. Thus, the card insertion load is suddenly increased in the middle of insertion, giving a poor operability to users.

Also, in the IC card reader 105 disclosed in Patent Reference 2 in which the lever 106 is pushed in directly by an IC card, the components, beginning from the lever 106 with which the IC card makes contact to the card latch lever 103, are connected to each other. Therefore, the card latch lever 103 starts coming down as the IC card is inserted, and may hit the IC card before the card is completely inserted. In that case, if the IC card keeps coming in, it may be damaged.

OBJECT AND SUMMARY OF THE INVENTION

Therefore, an object of the present invention is to provide an IC card reader in which the insertion load is not increased abruptly at the insertion of an IC card and in which the latch lever enters the closed mode after the IC card is completely inserted.

To achieve the above object, the present invention provides an IC card reader that comprises a contact head holding body which is given a force in the card discharge direction and makes contact with an IC card at the insertion of the card, a card latch lever that is operated between an open mode, in which an IC card can be inserted and removed, and a closed mode, in which an IC card cannot be inserted or removed, an operating arm that moves the card latch lever and holds it in the closed mode, an operating lever that moves the operating arm; and in which the card latch lever moves to the closed mode with the movements of the operating lever and operating arm after the IC card is inserted to a predetermined position; wherein the contact head holding body and the operating lever are connected with each other so that the operating lever moves synchronously with the movement of the contact head holding body.

Thus, since the contact head holding body and the operating lever are connected to each other and the operating lever is moved synchronously with the movement of the contact head holding body, the card insertion load does not increase abruptly in the middle of the card insertion. In other words, the insertion load is increased gradually, providing an excellent operability during the card insertion.

The present invention is, in the IC card reader, that one end of the operating lever is connected to the contact head holding body such that it can swing; one end of the operating arm is connected to the other end of the operating lever via a resilient member such that it can swing; the operating arm and the card latch lever are separated from each other; the operating arm has an engaging portion for controlling the movement of the operating arm; a stopper is provided for engaging with the engaging portion of the operating arm, and also an operating means is provided for moving the stopper; the engagement between the engaging portion and the stopper is cancelled after the IC card is inserted to a predetermined position so that the operating arm makes contact with the card latch lever to move it to the closed mode.

Thus, since the operating arm and card latch lever, both of which are used to maintain the card latching condition, are provided separately, and the card latch lever enters the closed mode when the IC card is completely inserted, the IC card can be firmly latched. Also, since the card latch lever does not move during the card insertion, the tip of the card latch lever will not make contact with the top surface of the card, preventing the damage to the IC card.

DESCRIPTION OF THE PREFERRED EMBODIMENTS

Figure 1:
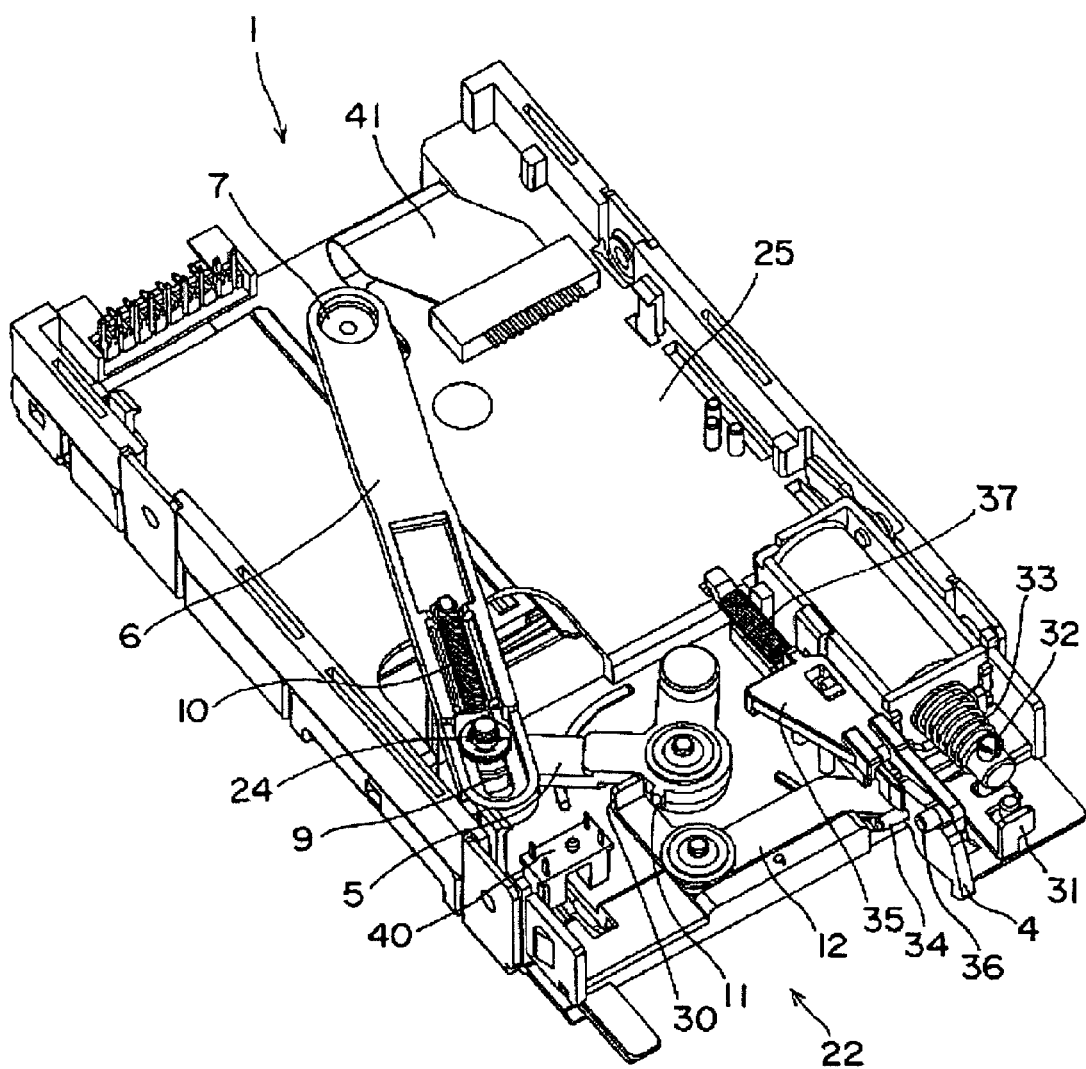
FIG. 1 is a perspective view of an IC card reader of the present invention.

The configuration of the present invention is described hereinafter based on the embodiment shown by the drawings.

FIGS. 1 through 8 show an embodiment of an IC card reader of the present invention. The IC card reader 1 comprises a contact head holding body, a card latch lever 4, an operating arm 5, and an operating lever 6. The contact head holding body 3, given a force in the card discharge direction, makes contact with an IC card 2 at the insertion of the card insertion. The card latch lever 4 has an open mode, in which the IC card 2 can be inserted and removed, and a closed mode, in which an IC card 2 cannot be inserted or removed. The operating arm 5 moves the card latch lever 4 and holds it in the closed mode. The operating lever 6 moves the operating arm 5. The card latch lever 4 enters the closed mode with the movements of the operating lever 6 and operating arm 5 after the IC card 2 is inserted to a predetermined position. Further, the contact head holding body 3 and the operating lever 6 are connected to each other so that the operating lever 6 moves synchronously with the movement of the contact head holding body 3.

One end 7 of the operating lever 6 is connected to the contact head holding body 3 such that it can swing. One end 9 of the operating arm 5 is connected to the other end 8 of the operating lever 6 via a resilient member 10 such that it can swing. The operating arm 5 and the card latch lever 4 are provided separately. The operating arm 5 has an engaging portion 11 for controlling the movement of the operating arm 5. This IC card reader 1 is equipped with a stopper 12 which engages with the engaging portion 11 of the operating arm 5 and an operating means 13 which moves the stopper 12. The engagement of the engaging portion 11 and the stopper 12 is cancelled when the IC card 2 is inserted to a predetermined position so that the operating arm 5 comes into contact with the card latch lever 4 to move it to the closed mode.

Figure 2:
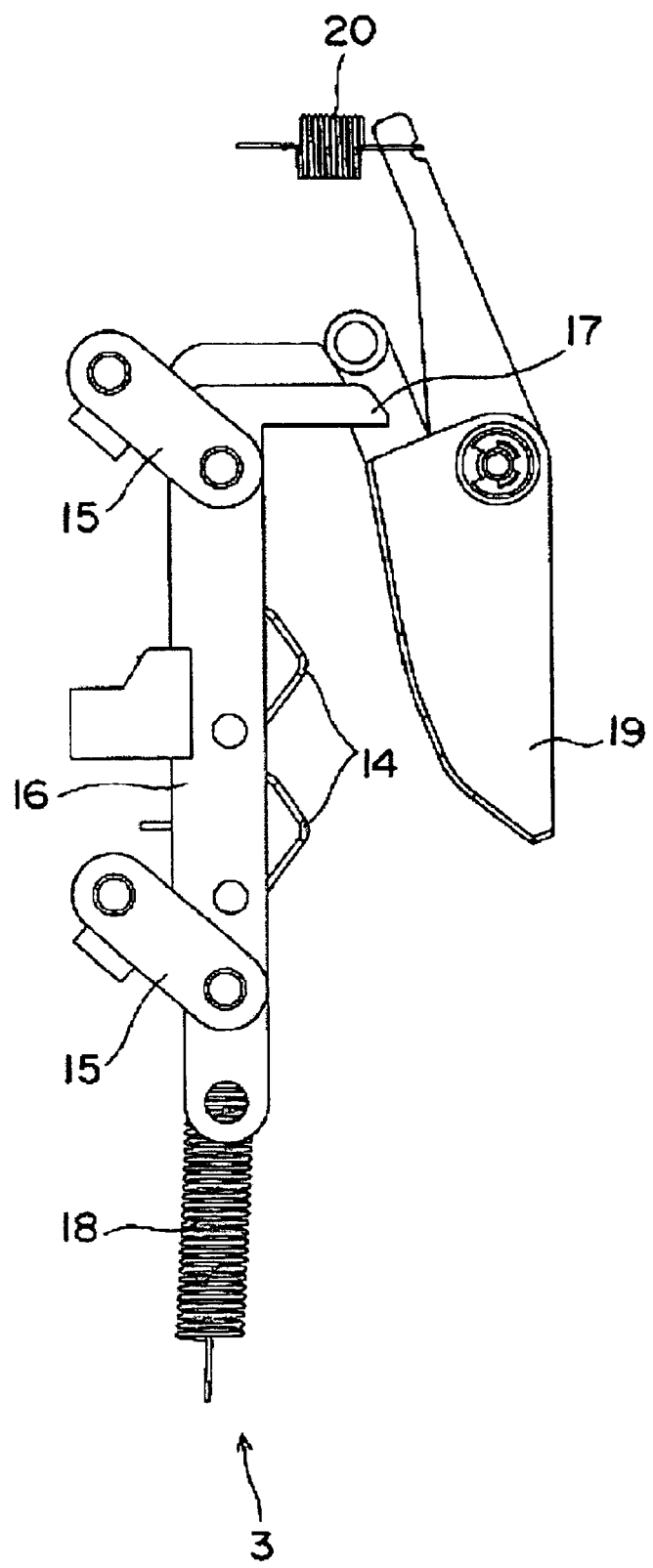
FIG. 2 is a side view of a contact head holding body before insertion of an IC card.
Figure 3:
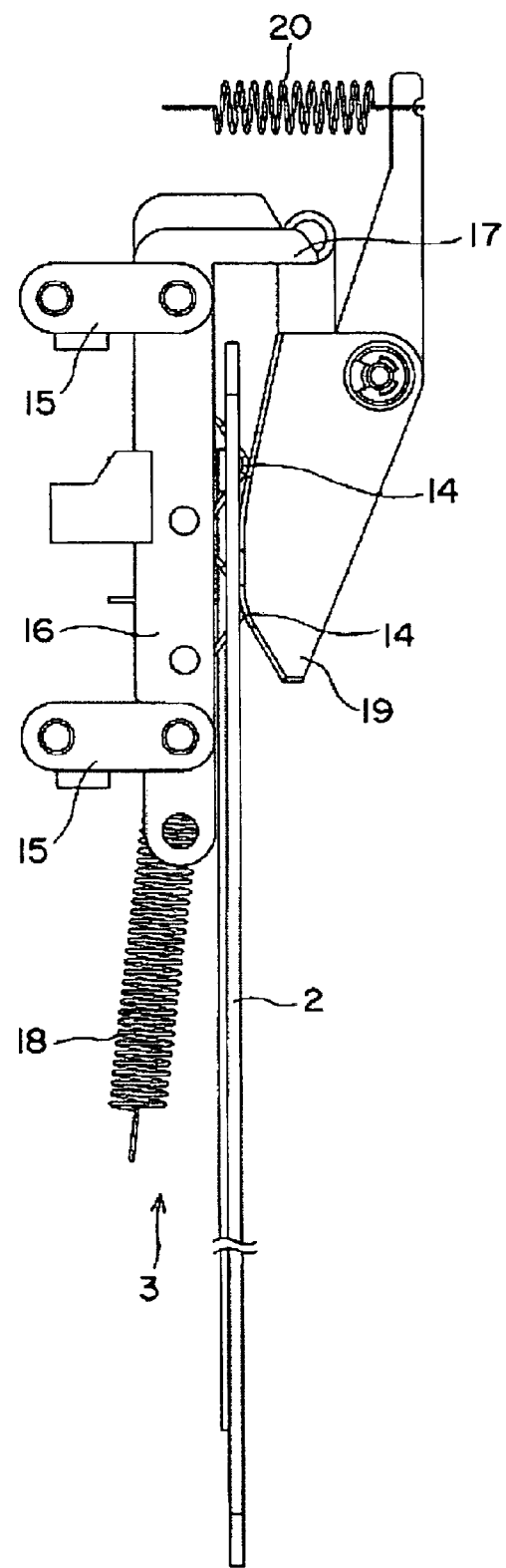
FIG. 3 is a side view of the contact head holding body after insertion of an IC card.

The contact head holding body 3 is used as an IC card connector. As illustrated in FIGS. 2 and 3, the contact head holding body 3 includes an IC contacts block 16 that has IC contacts 14 and is supported by parallel links 15, a contacting portion 17 that is formed to the IC contacts block 16 and with which the inserted IC card 2 makes contact, a pushing means 18 that pushes the IC contacts block 16 toward an insertion slot 22, a pressing means 19 that presses the IC card 2 onto the IC contacts block 16 as the IC contacts block 16 is pushed deep inside, and a returning spring 20 that pushes the pressing means 19 in the direction away from the IC card 2. When the IC card 2 is inserted to the contact head holding body 3, the incoming edge of the IC card 2 makes contact with the contacting portion 17 to push the IC contacts block 16 deep inside. With this operation, the IC contacts block 16 is guided by the parallel links 15 to bring the IC contacts 14 into contact with the IC card 2. At that time, the pressing member 19 presses the IC card 2 onto the IC contacts block 16 to obtain a firm contact between the IC card 2 and the IC contacts 14. The contact head holding body 3 that has the same function as the one illustrated in FIGS. 2 and 3 is provided in this embodiment, as illustrated in FIG. 4.

The contact head holding body 3 also has a contact-type switch which is not illustrated. The switch can detect whether or not the IC card 2 is completely inserted inside the contact head holding body 3. The contact head holding body 3 communicates with a circuit board through a flexible printed board 41. A rear sensor 42 composed of a micro switch is provided to the flexible printed board 41. The rear sensor 42 is turned on when the contact head holding body 3 is completely moved to the deep inside.

Figure 4:
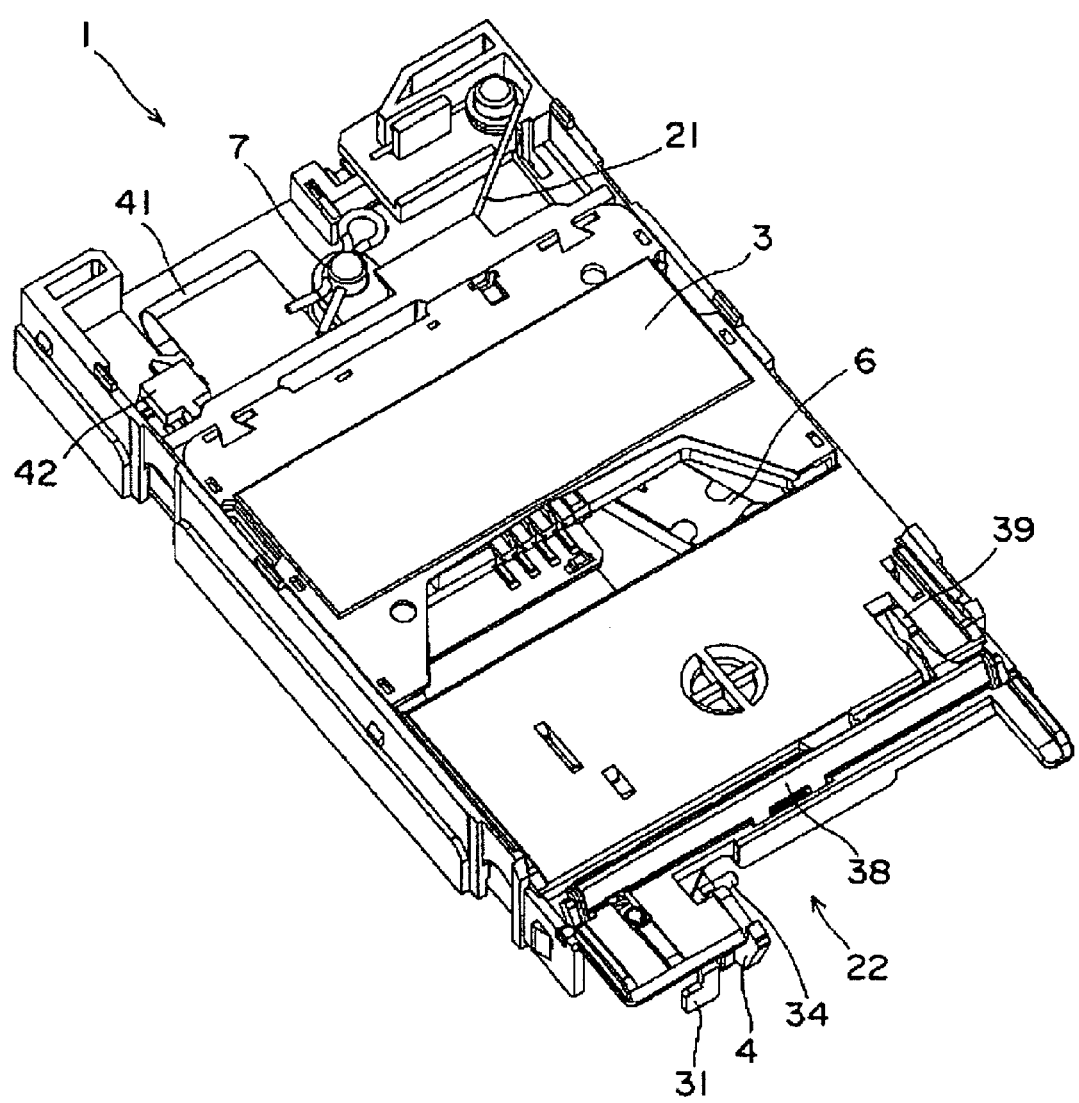
FIG. 4 is a perspective back view of the IC card reader.

The contact head holding body 3 is designed to be able to slide in the card insertion direction and in the card discharge direction as illustrated in FIG. 4, and is constantly being pushed in the card discharge direction by a holding body returning spring 21 which is provided in place of the pushing means 18 in FIGS. 2 and 3. In the center portion of the contact head holding body 3 on the deeper side, the end 7 of the operating lever 6 is rotatably connected by a support shaft 27.

As illustrated in FIGS. 5 through 8, a groove 23 is cut in the longitudinal direction along the operating lever 6 on the side of the insertion slot 22. A shaft 24 is attached to the end 9 of the operating arm 5 to slide along the groove 23. A resilient member 10 is provided between the shaft 24 and the operating lever 6. A pull coil spring is used for the resilient member 10 by which the end 9 of the operating arm 5 is constantly being pulled deep inside.

The operating arm 5 is formed in an L-shape. The corner portion of the L-shaped arm is rotatably supported (and joined) to a main frame 25 by a support shaft 28. The other end of the operating arm 5 functions to drive and hold the card latch lever 4.

The stopper 12 is rotatably supported (and joined) to the main frame 25 by the support shaft 29 in the same manner as the operating arm 5. The stopper has a stopping portion 30 that engages with the engaging portion 11 of the operating arm 5. The position of the stopping portion 30 at which it engages with the engaging portion 11 is the locked position (FIGS. 5, 6, and 8) and other positions of the stopping portion are the unlocked position (FIG. 7). The stopper 12 also has a manual release portion 31 that faces the insertion slot 22. The manual release portion 31 is used to manually move the card latch lever 4 from the closed mode to the open mode when an emergency such as power outage happens, so that the IC card 2 can be removed even at the time of an emergency. When a pin is pushed inside through a hole at a front bezel to push the manual release portion 31, the engagement between the operating arm 5 and stopper 12 can be cancelled.

Further, a solenoid is used as the operating means 13 to rotate the stopper 12. A plunger 32 of the operating means 13 is connected to the stopper 12 by a spring pin. The stopper 12 is constantly being pushed to the lock position by a plunger returning spring 33 provided to the plunger 32. When the operating means 13 is turned on, the stopper 12 is rotated to the unlock position.

The card latch lever 4 is rotatably attached to a rotary shaft 34 provided in the main frame 25. A latch lever drive member 35 is interposed between the card latch lever 4 and the operating arm 5. The card latch lever 4 has a groove along which a pin 36 of the latch lever drive member 35 slides.

The latch lever drive member 35 is able to move in the card insertion direction and in the discharge direction and is constantly being pushed deep inside by the returning spring 37. Further, the pin 36 is integrated with the latch lever drive member 35 for sliding along the groove in the card latch lever 4. When the latch lever drive member 35 slides in the card insertion direction or in the discharge direction, the card latch lever is rotated. In other words, when the latch lever drive member 35 is positioned deep inside, the card latch lever 4 is in the open mode; when the latch lever drive member 35 is positioned on the side of the insertion slot 22, the card latch lever 4 is in the closed mode.

As illustrated in FIG. 4, a shutter 38 is provided in the vicinity of the card insertion slot 22 such that it freely opens and closes by rotation. When a light-shield portion 39 integrated with the shutter 38 moves across a front sensor 40, the insertion of the IC card 2 is detected. A photo interrupter is used as the front sensor 40, which is mounted on a circuit board, for example.

An example of the operation of the above-mentioned IC card reader 1 is described.

Figure 5:
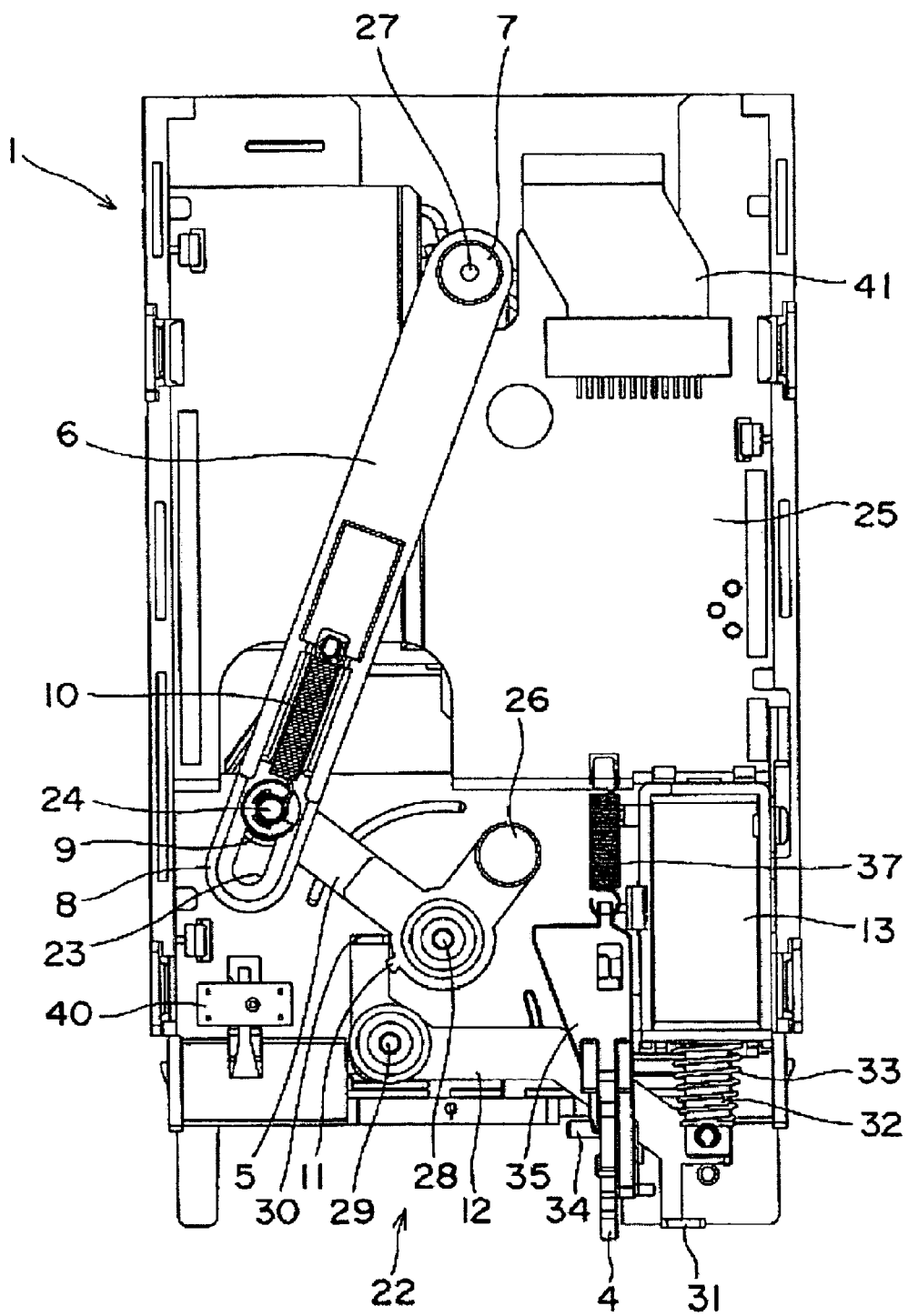
FIG. 5 is a plan view of the IC card reader before insertion of an IC card.

As an IC card 2 is inserted by hand at the card insertion slot 22 at the front bezel when there are no other cards inside, as illustrated in FIG. 5, the shutter 38 is opened and the insertion of the IC card 2 is detected by the front sensor 40. Then, the incoming edge of the IC card reaches the rear end of the contact head holding body 3; as the IC card 2 is inserted further inside, the contact head holding body 3 starts moving deeper inside. As the contact head holding body 3 moves, the operating lever 6 and the operating arm 5 also start moving.

Figure 6:
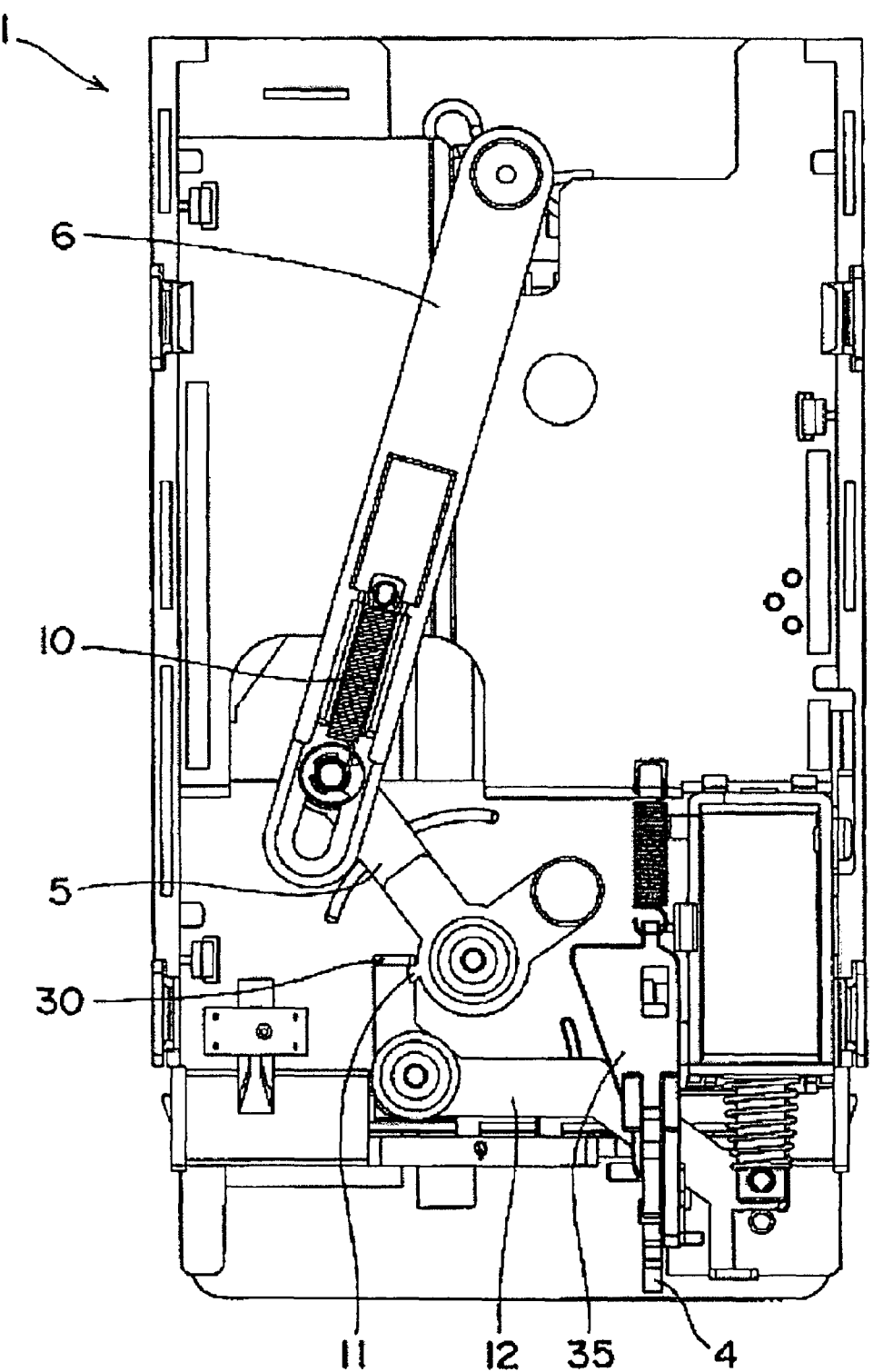
FIG. 6 is a plan view of the IC card reader during insertion of an IC card.
Figure 7:
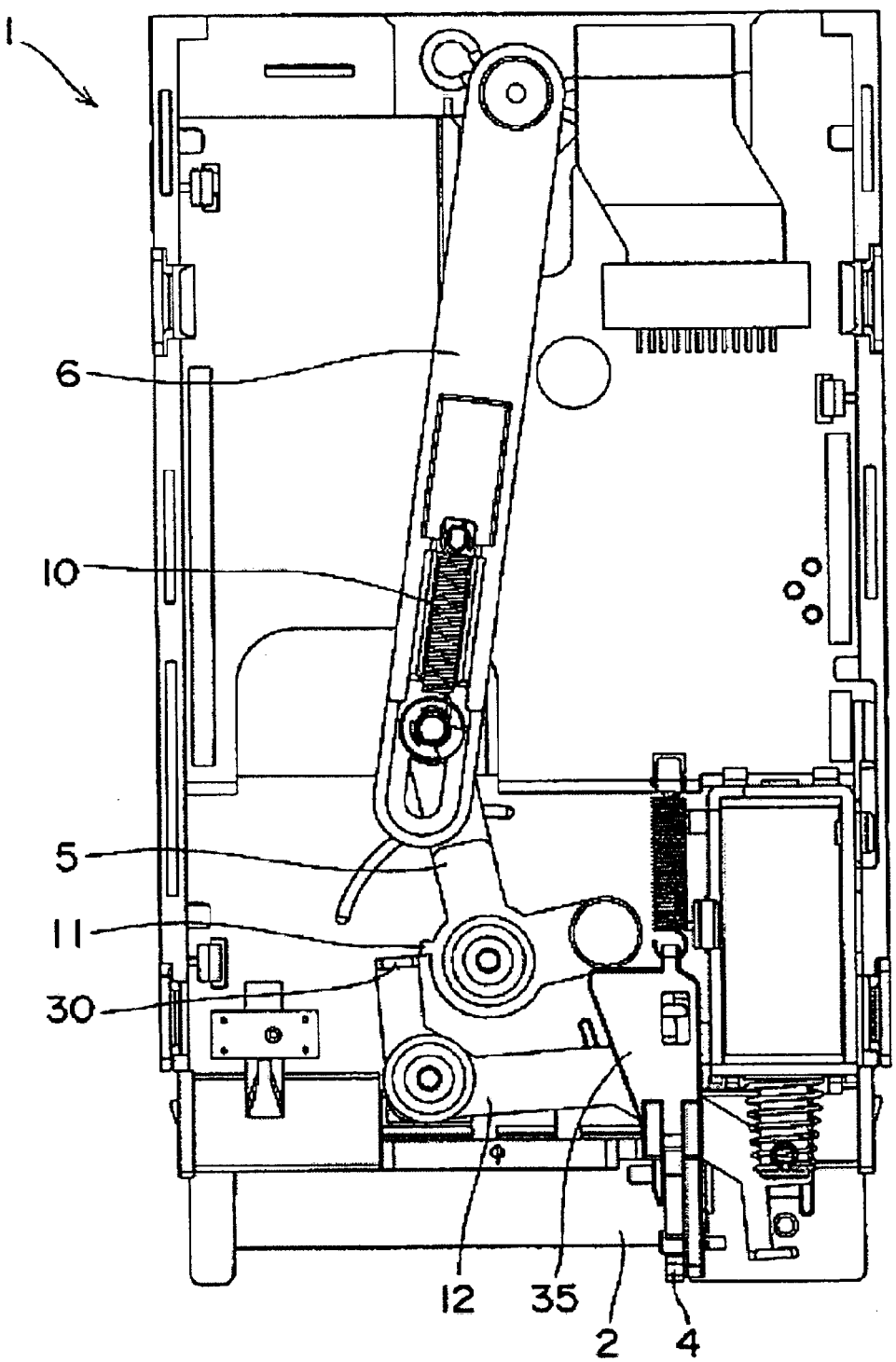
FIG. 7 is a plan view of the IC card reader in which an operating means is turned on upon completion of the IC card insertion.

As the IC card 2 is further pushed in, the engaging portion 11 of the operating arm 5 comes into contact with the stopping portion 30 of the stopper 12, and therefore the operating arm 5 stops rotating as illustrated in FIG. 6. Since the operating lever 6 and the operating arm 5 are simply connected by the resilient member 10, the operating lever 6 and the contact head holding body 3 reach the deepest position inside stretching the resilient member 10.

Under the condition where three sensors of the contact-type switch provided to the front sensor 40, the rear sensor 42, and the contact head holding body 3 are turned on, the operating means 13 is charged with one shot (tens ms). With this charge, the stopper 12 rotates to cancel the engagement between the stopping portion 30 and the engaging portion 11 of the operating arm 5, as illustrated in FIG. 7. Since the resilient member 10 has been tensioned, the operating arm 5 is rotated by the tension. At that time, the latch lever drive member 35 is pushed toward the insertion slot 22 by the operating arm 5 and the card latch lever 4 enters the closed mode.

Figure 8:
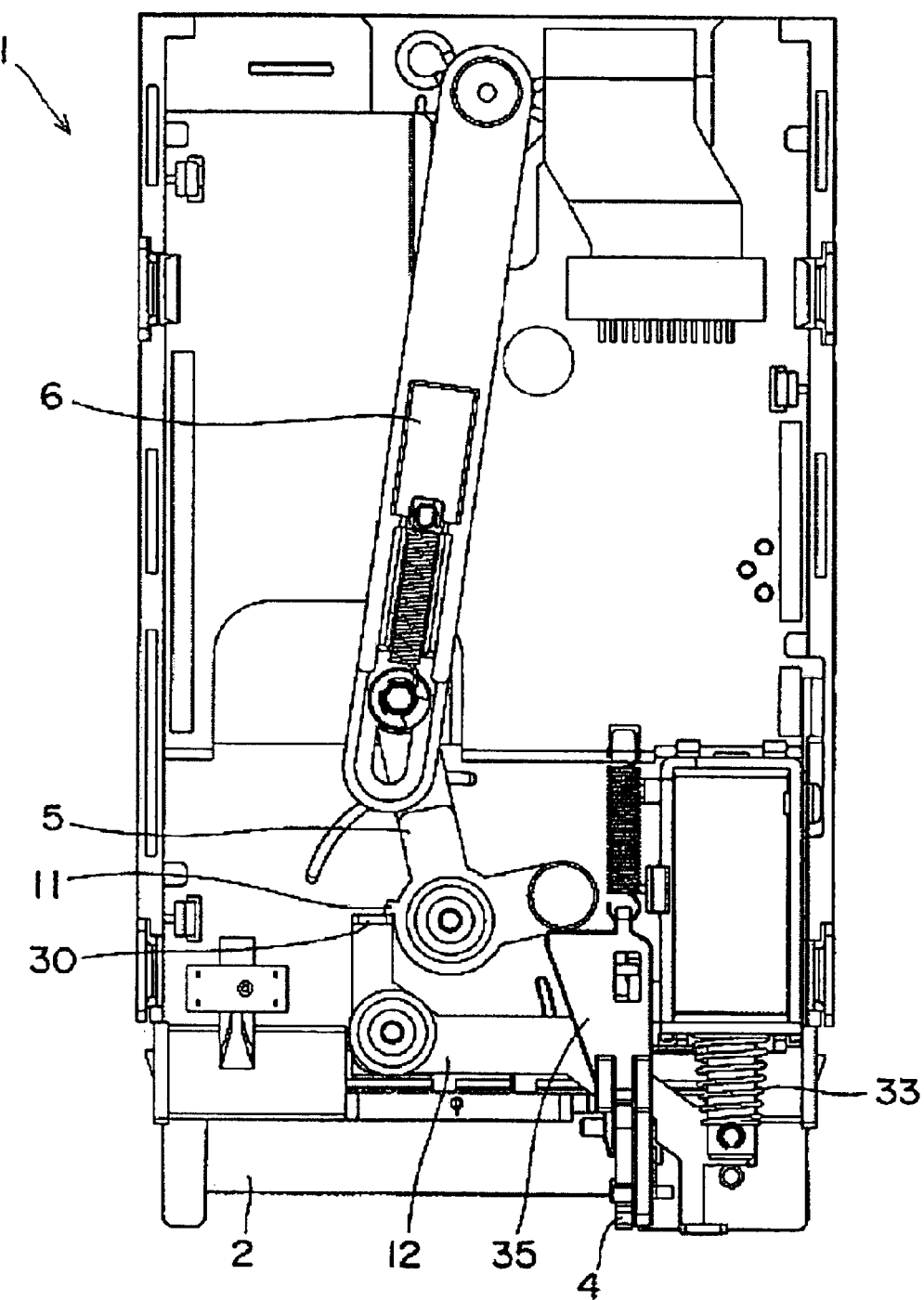
FIG. 8 is a plan view of the IC card reader in which an IC card is latched.
Figure 9:
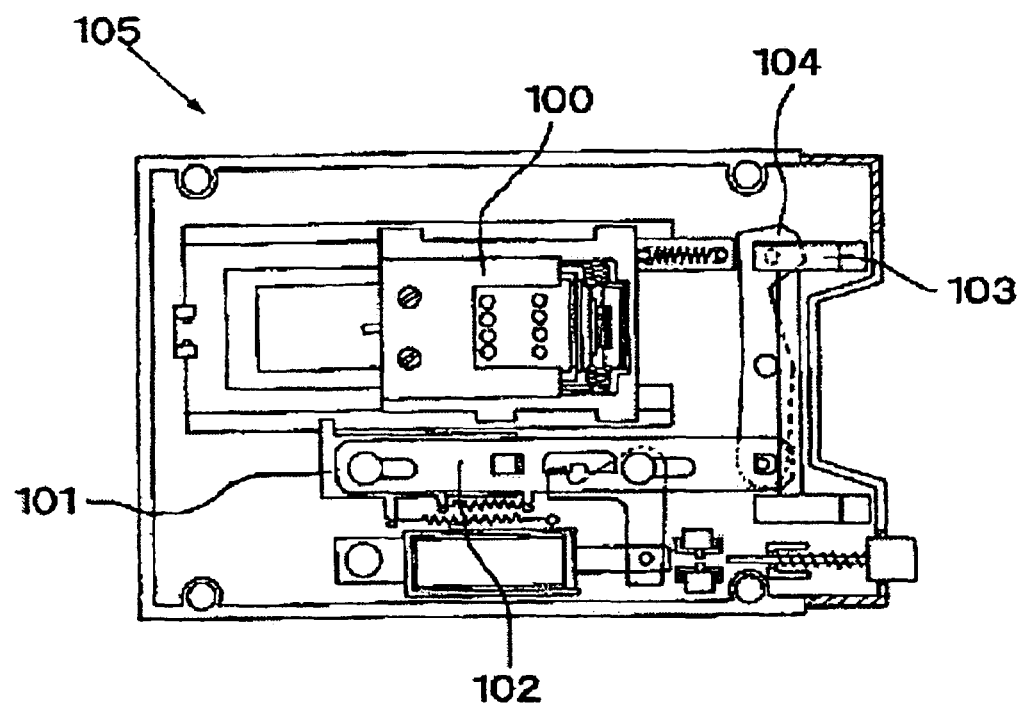
FIG. 9 is a plan view of a conventional IC card reader.
Figure 10:
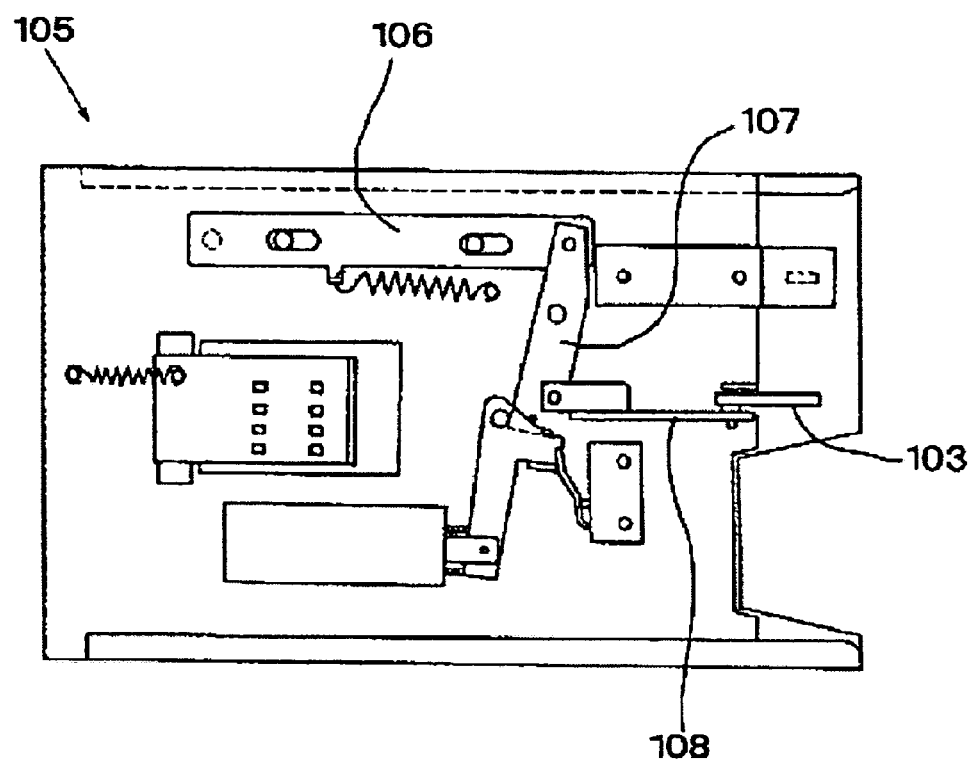
FIG. 10 is a plan view of another conventional IC card reader.

When the charging of the operating means 13 finishes, the stopper 12 is returned to the initial position by the plunger returning spring 33 as illustrated in FIG. 8. Also, as the latch lever drive member 35 is pushed deeper inside by the returning spring 37, the operating arm 5 is rotated and the stopping portion 30 engages with the engaging portion 11 of the operating arm 5. Through this operation, the card latching position is maintained to enable IC communication.

After IC communication, the operating means 13 is again charged with one shot. With this, the engagement between the engaging portion 11 of the operating arm 5 and the stopping portion 30 of the stopper 12 is cancelled. Then, the IC card 2 is automatically discharged by the holding body returning spring 21, and the IC card reader returns to the initial position.

According to the embodiment, the card latching position can be maintained mechanically; therefore, there is no necessity to keep charging the operating means 13 during the card latching and IC communication. Also, the operating means 13 is charged only to cancel the engagement between the engaging portion 11 of the operating arm 5 and the stopping portion 30 of the stopper 12. The charge period is also only of the order of tens ms, thus reducing electric consumption.

Note that, although the above-mentioned is a preferred example of the present invention, it is not limited to this example, but can be varyingly modified within the scope of the invention. For example, although the operating arm 5 and the card latch lever 4 are provided separately in this embodiment, they may be connected to each other.

Also, the latch lever drive member 35 is interposed between the card latch lever 4 and the operating arm 5 in this embodiment. However, the card latch lever 4 may be moved directly by the operating arm 5.

Further, a magnetic head is not mounted in the IC card reader 1 in this embodiment; however, a magnetic head may be mounted to configure an IC card reader to write and read magnetic information.

As described above, according to the IC card reader of this invetion, the contact head holding body and the operating lever are connected to each other so that the operating lever is operated synchronously with the movement of the contact head holding body; therefore, the card insertion load does not increase abruptly in the middle of insertion. In other words, the present invention can provide an IC card reader in which the insertion load increases gradually, giving excellent operability during the card insertion.

Furthermore, according to the IC card reader of this invention, the operating arm and the card latch lever that keep latching the card are provided separately and the card latch lever enters the closed mode only when the IC card is completely inserted. Thus, the IC card can be firmly latched. Also, since the card latch lever will not move during the card insertion, the point of the card latch lever does not make contact with the top surface of the card, preventing the damage to the IC card.

While the foregoing description and drawings represent the present invention, it will be obvious to those skilled in the art that various changes may be made therein without departing from the true spirit and scope of the present invention.

What is claimed is:

1. An IC card reader comprising:
    a contact head holding body which is given a force in the card discharge direction and makes contact with an IC card at the insertion of the card;
    a card latch lever that is operated between an open mode, in which an IC card can be inserted and removed, and a closed mode, in which an IC card cannot be inserted or removed;
    an operating arm for moving said card latch lever and for holding said card latch lever in said closed mode; and an operating lever for moving said operating arm, said card latch lever entering said closed mode with the movements of said operating lever and said operating arm after an IC card is inserted to a predetermined position;

wherein said contact head holding body and said operating lever are connected with each other so that said operating lever moves synchronously with the movement of said contact head holding body.

2. The IC card reader of claim 1 wherein one end of said operating lever is connected to said contact head holding body such that it can swing; one end of said operating arm is connected to the other end of said operating lever via a resilient member such that it can swing; said operating arm and said card latch lever are separated from each other; said operating arm has an engaging portion for controlling the movement of said operating arm; a stopper is provided to engage with said engaging portion of said operating arm, and an operating means is also provided to operate said stopper; the engagement of said engaging portion with said stopper is cancelled after said IC card is inserted to a predetermined position so that said operating arm makes contact with said card latch lever to move it to said closed mode.

* * * * *